Sept. 6, 1966  A. TAVERA  3,270,658
COFFEE MAKER
Filed Oct. 9, 1963
3 Sheets-Sheet 2
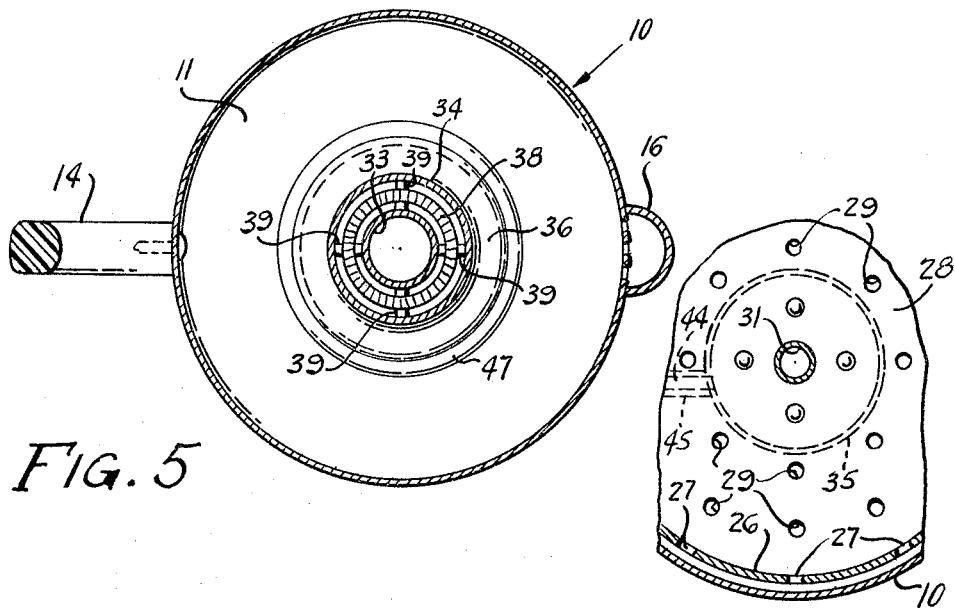
FIG. 5
FIG. 4
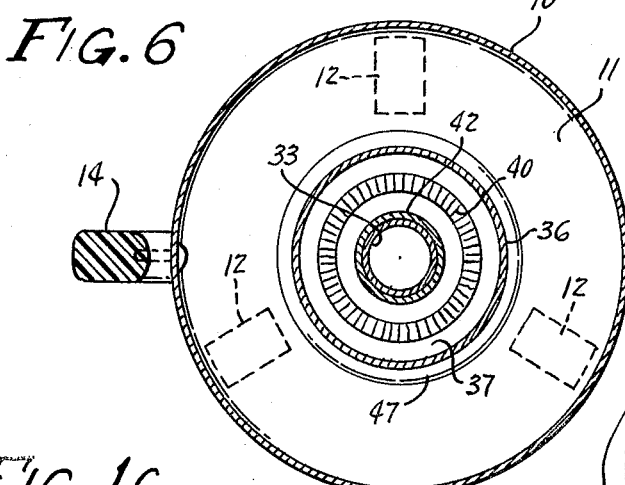
FIG. 6
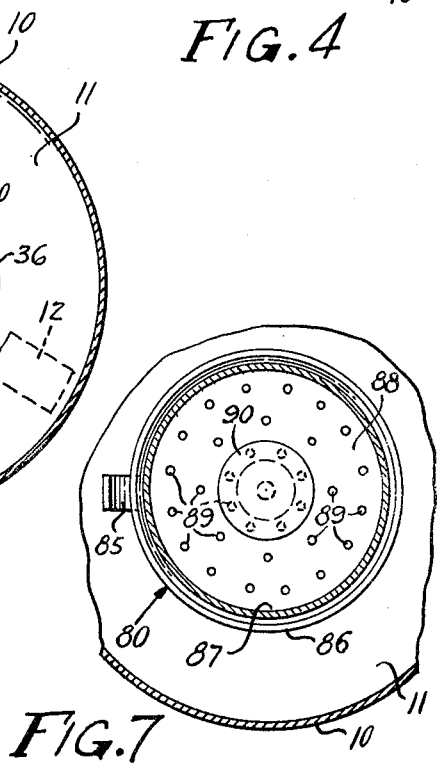
FIG. 7
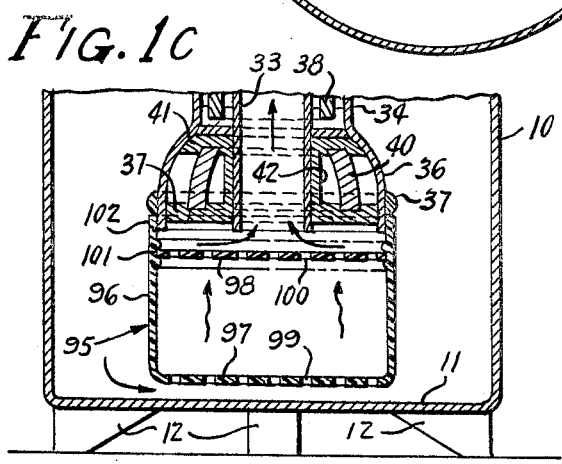
FIG. 1C
INVENTOR.
ANTONIO TAVERA
BY
Kimmel & Crowell
ATTORNEYS.

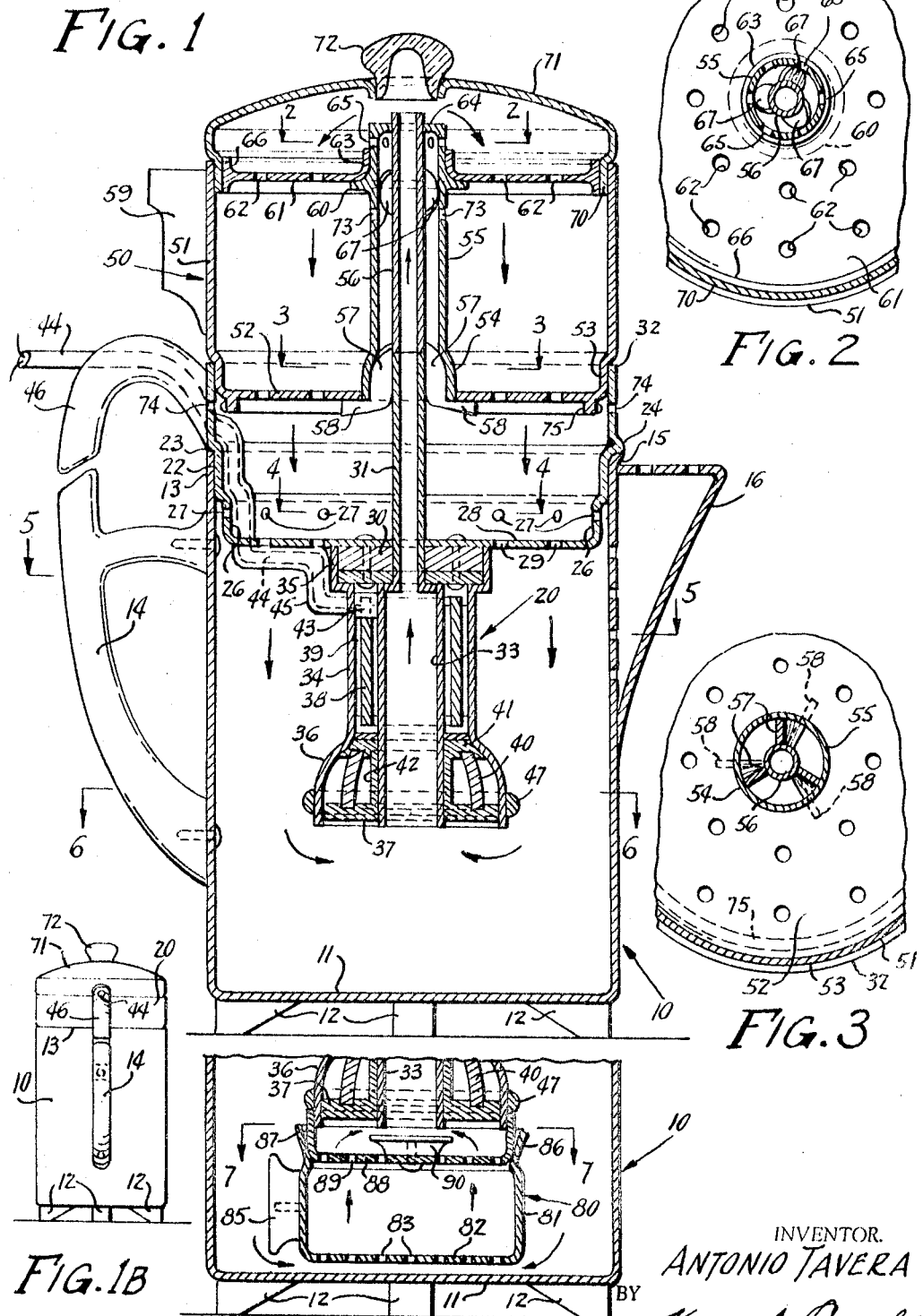

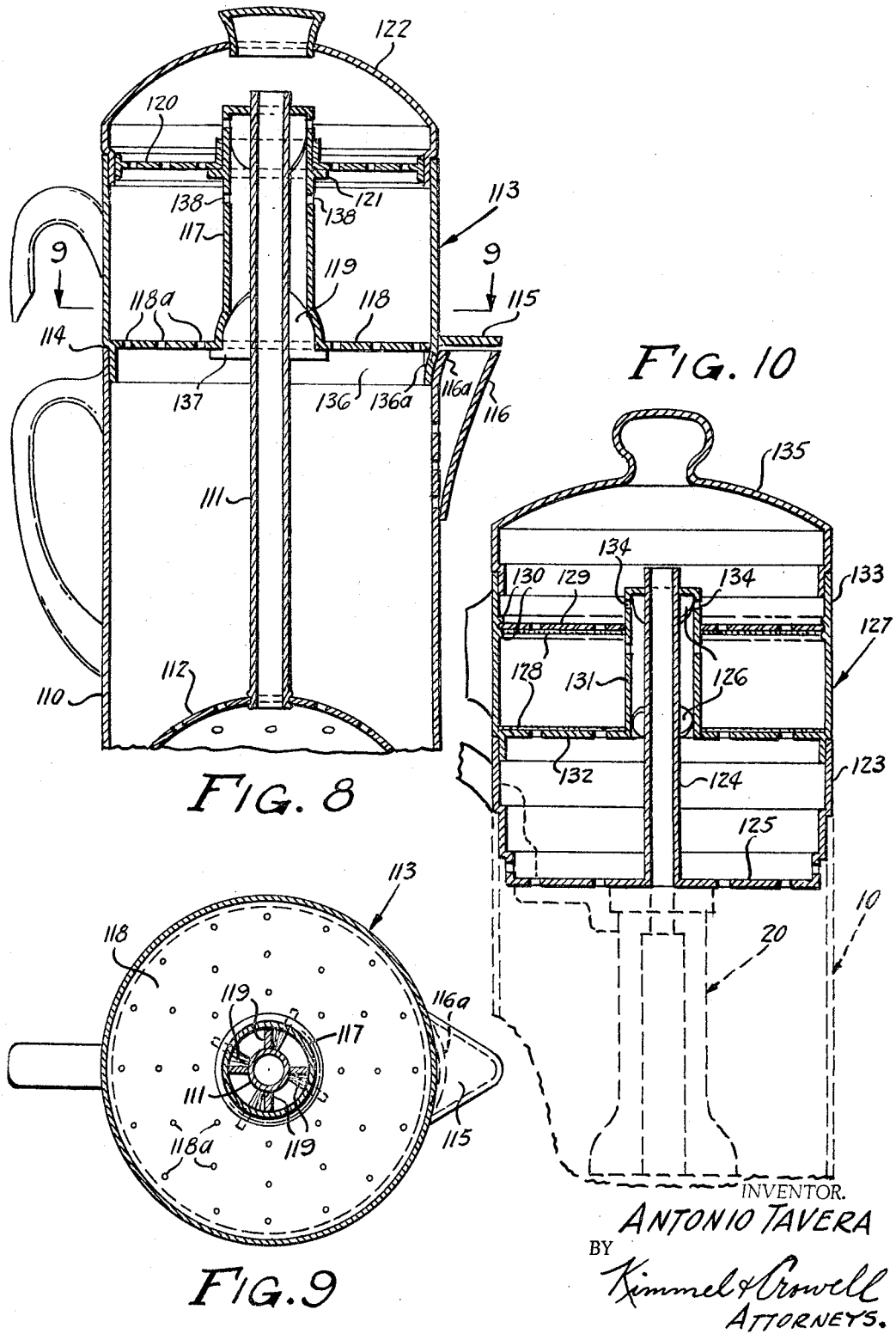

United States Patent Office 3,270,658
Patented Sept. 6, 1966

3,270,658
COFFEE MAKER
Antonio Tavera, Rte. 1, Box 1386, Elk Grove, Calif.
Filed Oct. 9, 1963, Ser. No. 315,019
8 Claims. (Cl. 99—295)

This invention relates to a coffee making device and has as its primary object the provision of an improved coffee maker which is characterized particularly by the provision of alternative cartridges containing the coffee, whereby the coffee may be percolated with the coffee on top exposed to the air with the use of one cartridge, or alternatively, cooked, as in the old fashioned boiled coffee, with the cartridge placed at the bottom of the unit.

An additional object of the invention is the provision of a device of this character wherein of the type of cartridge unit used burning of the coffee grounds is positively precluded so that there is no burn taste in the resultant coffee.

An additional object of the invention is the provision of a device of this character wherein the coffee cartridge may be readily and expeditiously removed prior to pouring of the coffee.

A further object of the invention is the provision of a device of this character wherein the heating coils for percolating or cooking the coffee are located at a central intermediate point of the pot, thus obviating the possibility of burning any loose grounds which may fall to the bottom of the pot, as in conventional devices of this character.

A further object of the invention is the provision of a device of this character wherein the cartridge may be supplied either for reuse, and refilling, or, alternatively, may be furnished as a prefabricated, premeasured unit.

A further object of the invention is the provision of a device of this character which, when the bottom cartridge unit is employed, may be advantageously employed for steeping tea, to provide all the advantages and taste, of boiled tea, without the possibility of loose leaves intermingling with the tea when completed.

A further object of the invention is the provision of a device of this character wherein all of the parts are readily disassemblable so that cleaning may be effected with a minimum of effort and difficulty.

Still another object of the invention is the provision of a device of this character which is sturdy and durable in construction, reliable and efficient in operation, and relatively simple and inexpensive to manufacture and utilize.

Still other objects will in part be obvious and in part be pointed out hereinafter as the description of the invention proceeds, and shown in the accompanying drawings wherein:

FIGURE 1 is a vertical sectional view of one form of coffee maker constructed in accordance with the instant invention showing one type of cartridge in use therewith.

FIGURE 1A is a fragmentary view of the lower portion of FIGURE 1 showing another type of cartridge in use therewith.

FIGURE 1B is a rear elevation, on a reduced scale, of the device of FIGURE 1A showing the lower cartridge in use, and the upper cartridge in its related components removed.

FIGURE 1C is a view similar to FIGURE 1A but showing a disposable cartridge for use in the device.

FIGURE 2 is a sectional view taken substantially along the line 2—2 of FIGURE 1 as viewed in the direction indicated by the arrows.

FIGURE 3 is a fragmentary sectional view taken substantially along the line 3—3 of FIGURE 1 as viewed in the direction indicated by the arrows.

FIGURE 4 is a fragmentary sectional view taken substantially along the line 4—4 of FIGURE 1 as viewed in the direction indicated by the arrows.

FIGURE 5 is a sectional view taken substantially along the line 5—5 of FIGURE 1 as viewed in the direction indicated by the arrows.

FIGURE 6 is a sectional view taken substantially along the line 6—6 of FIGURE 1 as viewed in the direction indicated by the arrows;

FIGURE 7 is a fragmentary sectional view taken substantially along the line 7—7 of FIGURE 1A as viewed in the direction indicated by the arrows;

FIGURE 8 is a vertical sectional view of a modified coffee maker in accordance with this invention utilizing a conventional coffee pot;

FIGURE 9 is a sectional view taken substantially along the line 9—9 of FIGURE 8 as viewed in the direction indicated by the arrows; and FIGURE 10 is a fragmentary sectional view of a further modification, portions similar to the embodiment of FIGURE 1 being shown in dotted lines.

Similar reference characters refer to similar parts throughout the several views of the drawing.

Having reference now to the drawing in detail, and more particularly to FIGURE 1, the device of the instant invention comprises a pot generally indicated at 10, which includes a bottom 11 which is supported on legs 12. The pot includes an open circular top portion 13, and is provided with a handle 14 of any conventional design. A recess 15 is cut in one portion of the open top rim 13, for a purpose to be more fully described hereinafter, directly in line with the spout 16 of conventional type.

A heating unit is provided generally indicated at 20 and includes a circular casing 21 which is provided with a first cutaway or recess portion 22 which forms a shoulder 23 which, when the heating element is in position is adapted to seat on the rim 13 of pot 10.

A projecting lug 24 engages in recess 15 in alignment with spout 16, to insure proper alignment of parts. Receptacle 21 includes a further reduced diameter portion 26, which is provided with annular perforations 27 and a bottom plate 28 which is also perforated as at 29. The perforations permit free circulation of fluid in the pot after running through casing 21. Filter paper or the like (not shown) may be placed on plate 28, if desired. A relatively heavy insulating plate 30 is secured to the bottom 28 and is provided with a circular opening into which extends a stem 31 to a point adjacent the top 32 or annular rim of casing 21. The stem extends through aligned openings in bottom 28 and insulating plate 30 and is integral with or in communication with a tube 33 which extends downwardly into the interior of the pot. The tube 33 is surrounded by a shell 34 which includes an upper annular portion 35 surrounding insulating plate 30 and the lower outwardly flared portion 36. A bottom insulating plate 37 closes flared portion 36 and surrounds tube 33 leaving the latter unimpeded for the passage of fluid therethrough. A first heating element 38 surrounds tube 33 interiorly of shell 34, and is suitably surrounded by insulating material 39, which protects both tube and shell from overheating, but permits heating of the fluid in the pot. A second heating element or coil 40 is positioned in the outwardly flared portion 36 of the shell and surrounds the stem 33 at its lower part. Insulating material 41 is positioned on the top of heating element 40 and on the inner side, as at 42 surrounding the tube 33. A thermostatic member 43 is positioned in an electric line 44 which extends through a suitable sealed tube 45 to the exterior of casing 21 and thence through an opening in a handle 46 to any desired source of electric current. The arrangement is such that the upper or first heating coil 38 is energized to boil the water in the pot and brew or percolate the coffee or tea, and, after a predetermined temperature is reached, is cut out by the thermostat 43.

The lower coil 40 is maintained at a low heat, and maintains the fluid in the pot at a desired temperature after the percolation has ceased. The portion 42 of insulating member 41 serves to prevent boiling of the water in the lower portion of tube 33, so that such boiling is effected only in the area which is surrounded by the coil 38.

A non-conductive annulus 47 surrounds the exterior of the outwardly flared portion 36 of shell 34, for a purpose to be more fully described hereinafter.

An upper cartridge assembly for percolating coffee is generally indicated at 50, and includes an annular shell or receptacle 51 having a perforated bottom 52 with an undercut portion 53 which seats on the top 32 of receptacle or casing 21. A central enlarged bore 54 is provided centrally of the bottom and extends into communication with the tube 55 which extends the full height of the device. A stem 56 extends interiorly of tube 55 and is adapted to be aligned with the top of stem 31 and securely held in position thereon by means of spirally shaped spacers 57 which seat within the enlarged portion 54 and have outwardly extending portions 58 which seat against the underside of the bottom 52. A handle is provided at 59. Stem 56 can be removed for cleaning by grasping extending portions 58 and twisting gently.

A flange 60 surrounds the upper portion of tube 55 and serves as a stop and a support for a top plate 61 which is provided with perforations 62 and a central upwardly extending flange 63. A closure plate 64 closes the top of tube 55 and extends around tube 56 and is positioned above bleed opening 65, so that moisture will accumulate on top of plate 61 and build up to bleed opening 65 before going through overflow. Plate 61 is provided with an outer rim or annulus 66 which seats against an undercut flange 70 which depends from the top 71 which is provided with a conventional central transparent removable knob 72. The plate 61 is of a sung, but removable press fit into lid 71, so that both are lifted out at the same time. Upper spiral spacers 67 similar in configuration to the lower spacer elements 57 surround tube 56 at its upper portion to maintain the same in proper alignment in position within the tube 55.

Breather holes 73 are provided in tube 55 and breather holes 74 are provided in casing 21. The cartridge 51 has a depending annular lip 75 which guides the coffee past breather holes 74.

In effect the tube 33, stem 31 and tube 56 together define a tubular means extending upwardly through the cartridge assembly 50 and downwardly into the pot 10.

The use of the apparatus when employed in conjunction with the cartridge 51 should now be readily apparent. Receptacle 51 is filled with coffee and pot 10 is filled to a desired height with water. The parts are then assembled as shown in FIGURE 1 and the electric cord 44 is connected to a suitable source of electricity. Heating element or coil 38 causes water to flow upwardly through tube 33, stem 31, and stem 56, and thence downwardly through perforations 62 through the coffee in receptacle 51 and through the perforations in bottom plate 52 and the perforations 29 in plate 28 downwardly again into the pot. The circulation of coffee is continued until the thermostat 43 cuts off the heating coil. At this time the cartridge 50 may be removed, and the top 71 positioned directly over the heating unit 20, at which time the coil 40 will serve to keep the coffee warm as long as may be desired. Alternatively, the heating unit 20 may be removed and the cover 71 positioned directly on the rim 13 of the pot 10 to facilitate pouring if desired.

An alternative form of cartridge is shown in FIGURE 1A, and generally indicated at 80. The cartridge 80 is of the reusable type, and includes a lower receptacle 81 having a bottom 82 provided with perforations 83. A handle member 85 is provided to facilitate handling thereof. A top outwardly flared flange 86 accommodates the upturned flange 87 of a top plate 88 which is provided with perforations 89 and an operating handle 90. The flange 87 is adapted to seat against the non-conductive ring 47, when this type of cartridge is used, and frictionally holds the cartridge 80 in spaced relationship to the bottom 11 of the pot 10. In this type of assembly the upper cartridge unit 50 is removed completely, as shown in FIGURE 1B, the receptacle 81 is filled with coffee and the lid or top plate 88 positioned firmly thereon. The heating element is energized in the manner previously described, and in this instance coffee is drawn upwardly through the perforations 83 and 89 and thence upwardly through the tube 33 and stem 31, whereupon impinging interiorly of the glass knob 72 it falls back through the receptacle or casing 21 and through the perforated plate 28 to return to the pot.

Tea may also be substituted for coffee in this type of cartridge, and the tea steeped in an identical manner to that described in conjunction with the coffee previously described.

FIGURE 1C discloses a disposable cartridge generally indicated at 95 which includes a plastic shell 96 having a permanent bottom 97 and top 98 provided with perforations 99 and 100, respectively, the top plate being removable for filling, and seated in an indentation 101 in an internal bead or in the receptacle. A flange 102 extends upwardly above top plate 98 and seats against non-conductive heat ring 47 in a manner similar to that previously described.

The cartridge in this case is used only once and then discarded, additional cartridges containing either tea or coffee being provided as necessary.

In the embodiment of FIGURES 8 and 9, a conventional coffee pot 110 is utilized having heating means (not shown) in the base or elsewhere to heat the contents therewithin. A tubular means 111 extends to the bottom of the pot 110 and is constructed similar to a conventional coffee pot stem means in that it has a conventional flared and perforated construction 112 at its lower end or other such conventional stem construction.

An upper cartridge assembly 113 similar to cartridge assembly 50 seats on the rim 114 of pot 110 with an outwardly extending spout cover 115 preventing the pouring of coffee through spout 116 so that the user will be reminded to remove the cartridge assembly 113 after the coffee is prepared. Of course, such a construction may be utilized with the previous embodiments if desired. A recess 116a is provided on spout 116 to receive an aligning portion 136a of peripheral flange 136 thereby aligning the spout cover 115 with the spout 116.

A tube 117 extends upwardly from a base 118 of the cartridge assembly 113 having perforations 118a therethrough and receives therethrough stem 111, spirally shaped spacers 119 ensuring proper alignment outwardly extending portions 137 similar to portions 58 of previous embodiments being provided. A perforated top plate 120 seats on flange 121, flange 121 is not an actual part of stem 111, the plate being snugly fit within lid 122. Breather holes 138 are provided in the tube 117.

Other portions of this embodiment are identical in construction to the embodiment of FIGURE 1 and the manner of utilizing the same is apparent.

FIGURE 10 discloses a further modification wherein a coffee pot 10 as in FIGURE 1 carrying heating unit 20 beneath a casing 123, a stem 124 being integrally formed with the perforated bottom plate 125 thereof and having spiral spacers 126 permanently secured thereto. A disposable cartridge assembly 127 having filter paper 128 internally thereof if desired, seats on casing 123 and carries perforated top plate 129 snapped between lugs 130 after coffee has been inserted therein. The cartridge assembly 127 can be premeasured and sealed to retain freshness or can be sold to be filled by the user. Central tube 131 through which stem 124 passes and in which spiral spacers 126 align the same extends upwardly from perforated bottom plate 132. The shell 133 of cartridge assembly 127 extends higher than vent holes 134 used for overflow thereby preventing coffee from running out between shell 133 and cover 135 carried thereby. The inside depth of the cover 135 is dimensioned to receive the stem 124 when the cartridge assembly 127 is removed.

The use and operation of the modification shown in FIGURE 10 is similar to the embodiment of FIGURE 1.

From the foregoing it will now be seen that there is herein provided an improved coffee making device, which accomplishes all of the objects of this invention, and others, including many advantages of great practical utility and commercial importance.

As many embodiments may be made in the embodiments hereinbefore shown and described, it is to be understood that all matter herein is to be interpreted merely as illustrative, and not in a limiting sense.

I claim:

1. In a coffee maker the combination of a pot having an annular top rim, a heating unit comprised of an open topped circular casing having a perforated bottom and a flange seating on said rim, an insulating plate secured to said bottom, a depending tube secured to said plate and extending into said pot, said plate and bottom having openings therein, a stem in communication with said tube extending to the top of said casing, a first heating coil surrounding said tube, insulating means mounting said first coil, a shell surrounding said coil to protect the same from fluid in the pot, an outwardly flared lower portion on said shell, an insulating member including a bottom insulating plate in said flared portion, a second heating coil in said insulating member, sealed conductive means for supplying electric current to said first and second coils, a coffee containing cartridge having openings communicating with said pot, water in said pot being circulated through said cartridge, tube, and stem, and a cover for said pot and casing.

2. The structure of claim 1 wherein said coffee containing cartridge comprises a circular receptacle having an undercut lower portion seating within the open top of said casing, and having perforate top and bottom plates and a controlled positioned second tube, a second stem in said tube communicating with the stem in said casing, means spacing said second stem from the interior of said tube and a closure member for the top of said second tube surrounding the top of said second hollow stem.

3. The structure of claim 2 wherein said tube is provided with bleed openings above said top perforate plate.

4. The structure of claim 2 wherein the means spacing said second hollow stem from the interior of said second tube comprises spiral spaced blades adjacent the top and bottom of said second stem and fixed thereto frictionally holding said second stem in said second tube.

5. The structure of claim 1 wherein said cartridge comprises a receptacle containing coffee and having a perforate top and bottom, legs on said bottom and an annular flange, said outwardly flared lower portion of said shell having a peripheral non-conductive annulus adjacent its lower end, said annulus abutting the top of said last-mentioned flange.

6. The structure of claim 5 wherein said top plate is removable and provided with a handle, whereby the cartridge is reusable.

7. The structure of claim 5 wherein said cartridge comprises a prepacked disposable unit.

8. The structure of claim 1 wherein thermostatic control means for said heating coils are provided internally of said shell.

References Cited by the Examiner

UNITED STATES PATENTS

| | | | |
|---|---|---|---|
| 866,985 | 9/1907 | Trewhella | 99—312 X |
| 1,155,166 | 9/1915 | Rose. | |
| 1,359,390 | 11/1920 | Kuhn et al. | |
| 1,995,081 | 3/1935 | Sommers | 99—312 X |
| 2,020,104 | 11/1935 | Collin | 99—311 |
| 2,190,522 | 2/1940 | Pagliuco | 99—306 X |
| 2,290,660 | 7/1942 | Wilcox | 99—281 X |
| 2,313,761 | 3/1943 | McMenamin | 99—312 |
| 2,522,558 | 9/1950 | Alverez | 219—436 |
| 2,523,261 | 9/1950 | Alverez et al. | 219—436 X |
| 2,794,106 | 5/1959 | Andres et al. | 219—436 |
| 3,083,100 | 3/1963 | Baran | 99—295 X |
| 3,095,801 | 7/1963 | Fogg | 99—312 |

WALTER A. SCHEEL, *Primary Examiner.*

IRVING BUNEVICH, *Examiner.*

STANLEY P. FISHER, *Assistant Examiner.*